United States Patent
Robertson (10) Patent No.: US 7,343,640 B1
(45) Date of Patent: Mar. 18, 2008

(54) AUTOMATIC FESTOONED HOSE APPARATUS FOR PUBLIC TRANSIT VACUUMING SYSTEMS AND METHODS FOR USING SAME

(76) Inventor: James B. Robertson, 33381 Coral Reach, Dana Point, CA (US) 92629

( * ) Notice: Subject to any disclaimer, the term of this patent is extended or adjusted under 35 U.S.C. 154(b) by 641 days.

(21) Appl. No.: 10/910,241

(22) Filed: Jul. 30, 2004

Related U.S. Application Data (60) Provisional application No. 60/491,709, filed on Aug. 1, 2003.

(51) Int. Cl.
*A47L 5/38* (2006.01)
(52) U.S. Cl. .............................. 15/315; 15/314; 134/21
(58) Field of Classification Search ................. 15/314, 15/315; 248/75, 89; 137/615, 355.23, 355.2, 137/355.16; 134/21; *A47L 5/38*
See application file for complete search history.

(56) References Cited

U.S. PATENT DOCUMENTS

| | | | | |
|---|---|---|---|---|
| 2,854,680 A | * | 10/1958 | Wilson .......................... | 15/315 |
| 3,014,494 A | * | 12/1961 | Scott et al. .................. | 137/615 |
| 4,540,202 A | * | 9/1985 | Amphoux et al. ............ | 15/314 |
| 5,524,548 A | | 6/1996 | Fox .............................. | 104/89 |

FOREIGN PATENT DOCUMENTS

SU          1507310 A1 *  9/1989

\* cited by examiner

*Primary Examiner*—Theresa T. Snider
(74) *Attorney, Agent, or Firm*—Stout, Uxa, Buyan & Mullins, LLP; Donald E. Stout (57) ABSTRACT

An automatic festoon hose handling system for mass transit vehicles such as buses or the like, includes a vacuum or pressurized fluid source, a hose connected to the source, and a lance portion disposed on a distal end of the hose. A festoon assembly is positioned for suspending the hose from an overhead support. The hose is pneumatically extendable and retractable.

18 Claims, 6 Drawing Sheets

FIG. 3B

AUTOMATIC FESTOONED HOSE APPARATUS FOR PUBLIC TRANSIT VACUUMING SYSTEMS AND METHODS FOR USING SAME

This application claims the benefit of U.S. provisional patent application No. 60/491,709, filed on Aug. 1, 2003, the entire disclosure of which is incorporated herein by this specific reference.

BACKGROUND OF THE INVENTION

The present invention relates to systems for vacuuming, blow nozzle cleaning, or extracting fumes from mass transit vehicles, and more particularly to any such system which employs festooned hoses.

Commonly, public transit systems, having a large number of passenger buses, employ vacuuming, blow nozzle cleaning stations, or fume extracting systems for such buses which comprise one or more lanes or service bays into which the bus is driven, adjacent to vacuuming, fume extracting, or cleaning equipment. The vacuuming, fume extracting, or cleaning equipment typically comprises a motorized or pneumatically driven vacuum pump or blower, additional vacuum pump (if needed), material collection system, and dumpster container, from which one or more lengthy hoses extend. At the distal end of each hose, which may be one or more inches in diameter, is provided a lance and nozzle. As is well known in the art of vacuuming, blow nozzle cleaning, or fume extraction systems, the hose functions to communicate the vacuum or blow nozzle air flow generated by the motorized vacuum pump or blower to the nozzle. Dirt, paper, or fumes are either picked up or blown away, as the case may be, by the nozzle, when being removed from the area being vacuumed or cleaned. Vacuumed material moves through the hose, ducting, and appropriate collector, and are deposited into a dumpster container to be emptied later, when full. Fume extraction systems do not require a collection system and dumpster container, but are usually exhausted to atmosphere directly. In prior art vacuuming, blow nozzle cleaning, and fume exhaust stations for vacuuming, cleaning or extracting fumes from mass transit buses and the like, an operator enters the bus for cleaning or goes to the bus engine exhaust pipe for fume extraction, which is parked in the cleaning station or service bay, carrying the lance end of the vacuum equipment for the purpose of vacuuming, cleaning, or extracting fumes from the bus.

A problem in such prior art vacuuming, blow nozzle cleaning, and exhaust extraction stations, is that the hose, because of its length, can be extremely unwieldy, making the vacuuming, cleaning, or fume extraction function difficult. Such hoses are most often deployed on hose reels, or manual counterbalance festoons. Hose reels include a large mounting structure system and a strong retraction mechanism to ensure that the hoses remain coiled about the reel, typically suspended from an adjacent wall or ceiling, except when extended for use. The pull forces exerted by the retraction mechanism makes hose manipulation by an operator difficult, can be a safety problem, because of the employment of large and powerful moving parts, and can also cause hose damage over time. As a practical matter, because of the retraction mechanism, hose reels typically require a remote control system at the distal (lance) end, so that the operator can alleviate the pulling force of the retraction mechanism when hose extension and manipulation are required. Such systems, however, are expensive and unreliable. Existing hose reel systems often fail or are more costly because of vacuum system plugging, are aesthetically displeasing, and are expensive to install or relocate. Manual counterbalance festoons utilize a counterweight that pulls the hose back to the fully retracted position. The "pull-back" force is greatest when the hose is fully extended and least when the hose is fully retracted. The hose operators must exert a continuous force against the counterweight "pull-back" while manipulating the extended hose and therefore becomes a burden to use.

What is needed, therefore, is a system for retaining lengthy hoses which eliminates the need for hose reels or manual counterbalance festoons, but permits the hoses to be retracted to a neat, attractive, and out-of-the-way disposition when the system is not in use, and permits the hoses to be readily deployed and manipulated, without "pull-back" during system usage.

SUMMARY OF THE INVENTION

Accordingly, there is provided an automatic hose festooning system constructed in accordance with the principles of the present invention which meets the foregoing objectives.

More particularly, in one aspect of the invention, there is provided a festoon hose handling system for mass transit vehicles such as buses, or the like, which comprises a motorized vacuum or fluid pressure (blower) source, an additional motorized vacuum pump (if needed), a hose connected to the vacuum source, a distal end of the hose, through which fluid can pass, and a festoon assembly for suspending the hose from a suitable support, such as a ceiling or wall, wherein the hose is pneumatically extendable and retractable.

In a preferred embodiment, as just noted above, a control switch is disposed in proximity to the hose distal end, such as on the lance portion of the hose, or some other stationary remote location, for pneumatically extending and retracting the festooned hose. The festoon assembly preferably comprises a festooning tube having a movable piston disposed therein, and a chamber disposed adjacent to the piston. The chamber has a flow passage connected thereto for permitting the pressure in the chamber to be changed, in order to move the piston in a desired direction. Preferably, the flow passage includes a valve therein for controlling flow, which is selectively actuatable between a closed and an open position. In one embodiment, this valve comprises a three-position valve which is selectively actuatable between the closed position, an open to vacuum position, and an open to atmosphere position. Alternatively, in another embodiment, the aforementioned flow passage comprises two connected flow passages, wherein the valve is disposed in one of the flow passages, and a second valve, also selectively actuatable between a closed and an open position, is disposed in a second one of the flow passages.

A cord is attached to the piston on one end, and to the festooned hose on a second end, wherein when the piston moves in a first direction, the cord moves with the piston in the first direction to extend the hose, and when the piston moves in a second direction, the cord moves with the piston in the second direction to retract the hose. A brake is preferably disposed adjacent to the cord at a predetermined location, and is selectively actuatable between a set position, wherein the cord is prevented from moving, and a released position, wherein the cord is free to move. A plurality of pulleys are provided about which the cord is arranged to travel when moving in the first or second directions. Advantageously, because the system does not employ a hose reel, which would necessitate fully coiling the hose thereabout, a control wire may be disposed along the festooned hose along a substantial length thereof, electrically connecting the control switch to a control unit, rather than having to use a wireless remote control system.

In another aspect of the invention, there is provided a festoon hose handling system for mass transit vehicles such as buses, which comprises a motorized vacuum or fluid pressure source and a hose connected to the vacuum or fluid pressure source, and a festoon assembly for suspending the hose from a suitable support. The festoon assembly comprises a cord attached to the festooned hose on one end and to a movable member on a second end, wherein the movable member is actuatable to selectively retract and extend the hose. A control switch is preferably disposed in proximity to a distal portion of the festooned hose, such as on the lance portion thereof, or in a suitable remote location adjacent thereto, for actuating the movable member, which is preferably pneumatically driven.

Also provided in the inventive system is a festooning tube in which the movable member is disposed, and a chamber located adjacent to the movable member. The movable member, or piston, is arranged to reciprocate within the festooning tube responsive to changes in pressure in the chamber.

A flow passage is connected to the chamber for permitting the pressure in the chamber to be selectively changed, and a valve is disposed in the flow passage which is selectively actuatable between a closed and an open position. The flow passage connects the chamber to the vacuum or fluid pressure source, through the valve.

In operation, the system has a stowed configuration, wherein the hose is stowed in a retracted condition, and an extended configuration, wherein the hose is extended in an operational condition. The system further has a retracted configuration, in which configuration the hose is permitted to retract to the retracted condition from the extended condition, but it is not stowed away.

In still another aspect of the invention, there is disclosed a method of vacuuming, cleaning, or extracting fumes from a mass transit vehicle such as a bus or the like, using a system having a festooned hose which is suspended from a suitable support using a festoon assembly comprising a cord attached to the hose on one end, and to a movable member on a second end. The disclosed method comprises steps of actuating a control switch to cause the movable member and connected cord to move in a first direction toward the festooned hose, thereby extending the festooned hose to a desired cleaning location, and maneuvering the festooned hose as desired to vacuum, clean, or extract fumes from the desired location and any other desired locations within a range of travel of the vacuum hose and connected cord. A third step is disclosed, which comprises actuating the control switch to cause the movable member and connected cord to move in a second direction opposite to the first direction, thereby retracting the festooned hose to a storage position.

The inventive festooning system functions to advantageously provide immediate hose availability, reduce the time and motion needed to press control buttons, eliminates the need for remote control transmitter handset handling, and simplifies and eases hose handling by keeping the hose off the vehicle floor during cleaning operations.

The invention, together with additional features and advantages thereof, may best be understood by reference to the following description taken in conjunction with the accompanying illustrative drawing.

BRIEF DESCRIPTION OF THE DRAWINGS

FIG. 2a is a schematic view of the embodiment of FIG. 1a, wherein the hose and lance are in an extended position for vacuuming, blow nozzle cleaning, or extracting fumes from a mass transit vehicle or the like;

FIG. 3a is a schematic view, similar to FIGS. 1a and 2a, wherein the system is in a retracting orientation for the purpose of retracting the extended hose and nozzle to the stowed position shown in FIG. 1a.

DESCRIPTION OF THE PREFERRED EMBODIMENT

Referring now more particularly to FIGS. 1a-3b, there is shown an automatic festooned vacuuming, blow nozzle cleaning, or fume extraction system 10 which is constructed in accordance with the principles of the present invention. The system 10 comprises a motorized vacuum blower source 12 and, optionally, a motorized vacuum pump 13, both of known construction. In a preferred embodiment, the vacuum blower 12 and the vacuum pump 13 have a combined negative pressure rating of approximately 40" to 200" water column. In certain applications, other vacuum or pressure fluid sources, such as, for example, a compressed air powered venturi vacuum pump, may be used. Compressed air powered venturi vacuum pumps of this type, which are small (about 1"×6"), inexpensive, easy to install, have no moving parts, and are excellent for on/off applications, may be particularly suitable for certain applications, particularly those where compressed air is available, one festoon is being installed, and the vacuum source must be a substantial distance away from the festoon system. An upright cylinder or festooning tube 14 includes an air-tight or close tolerance fitting piston 16 which is free to reciprocate vertically within the festooning tube 14. Proximally of the piston 16, at a lower end of the festooning tube 14, is disposed a cylinder chamber 18, from which extends a main flow line 20, so that fluid (air) may flow through the main flow line 20 into and out of the cylinder chamber 18.

Figure 1A:
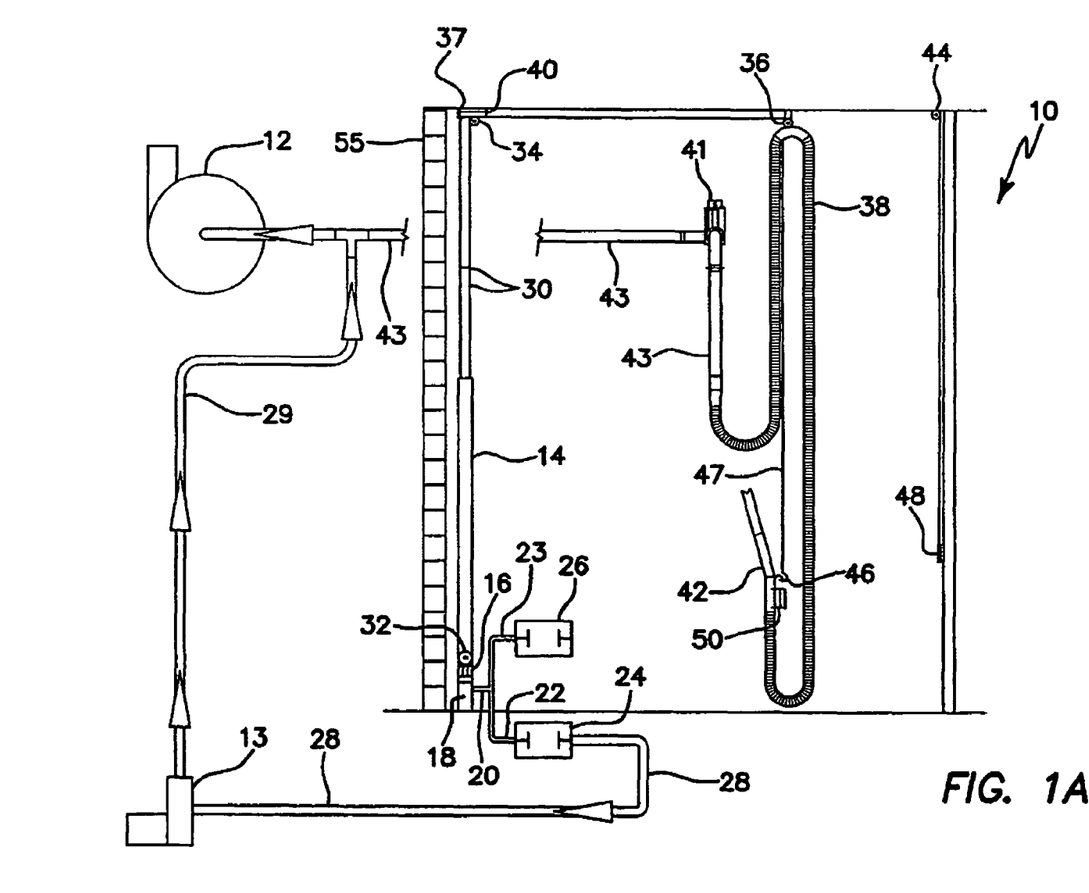
FIG. 1a is a schematic view of one embodiment of a festooned vacuuming, blow nozzle cleaning, or fume extraction system constructed in accordance with the principles of the present invention, wherein the hose and associated lance are disposed in a fully retracted position.
Figure 2A:
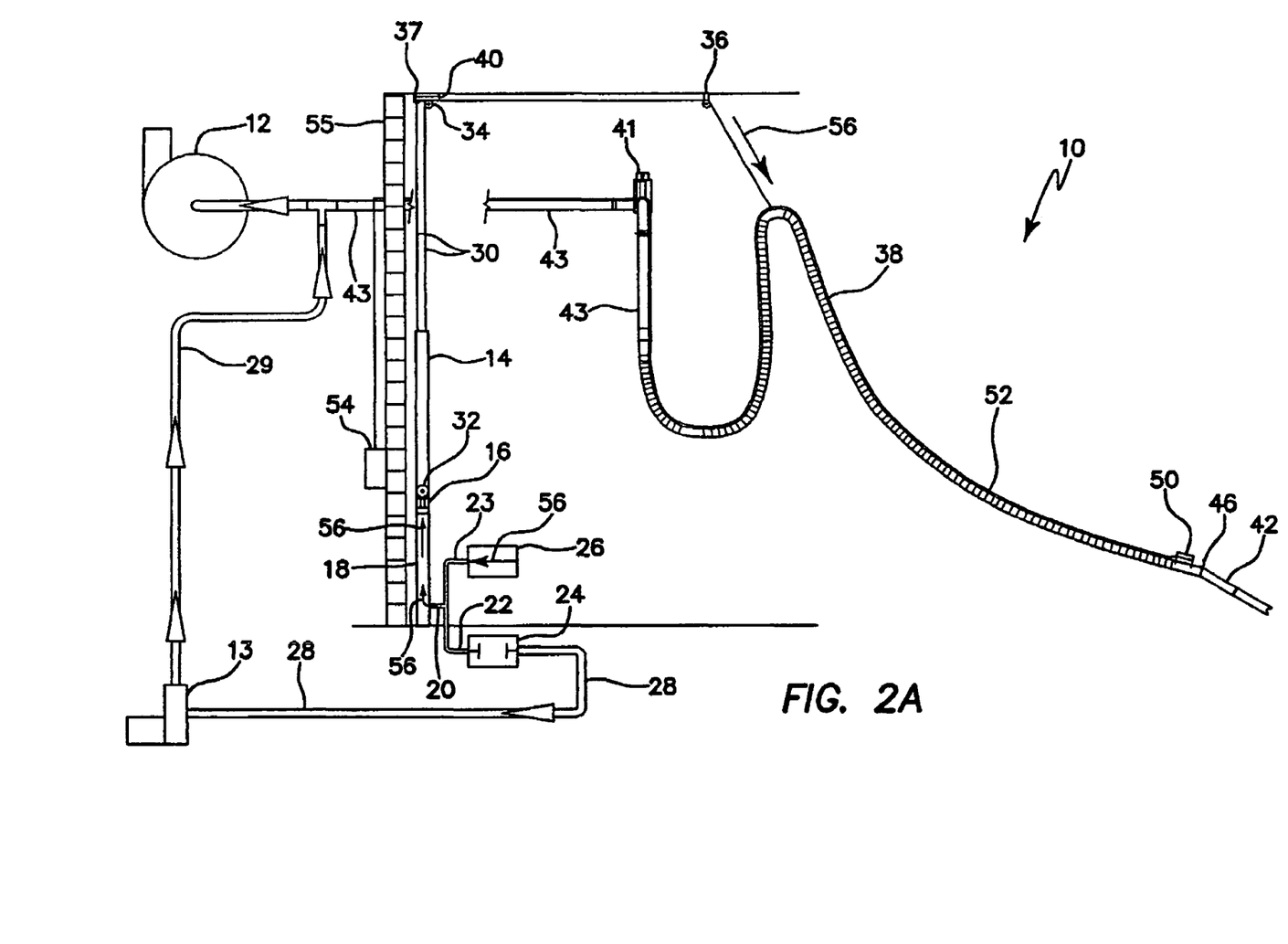
Figure 3A:
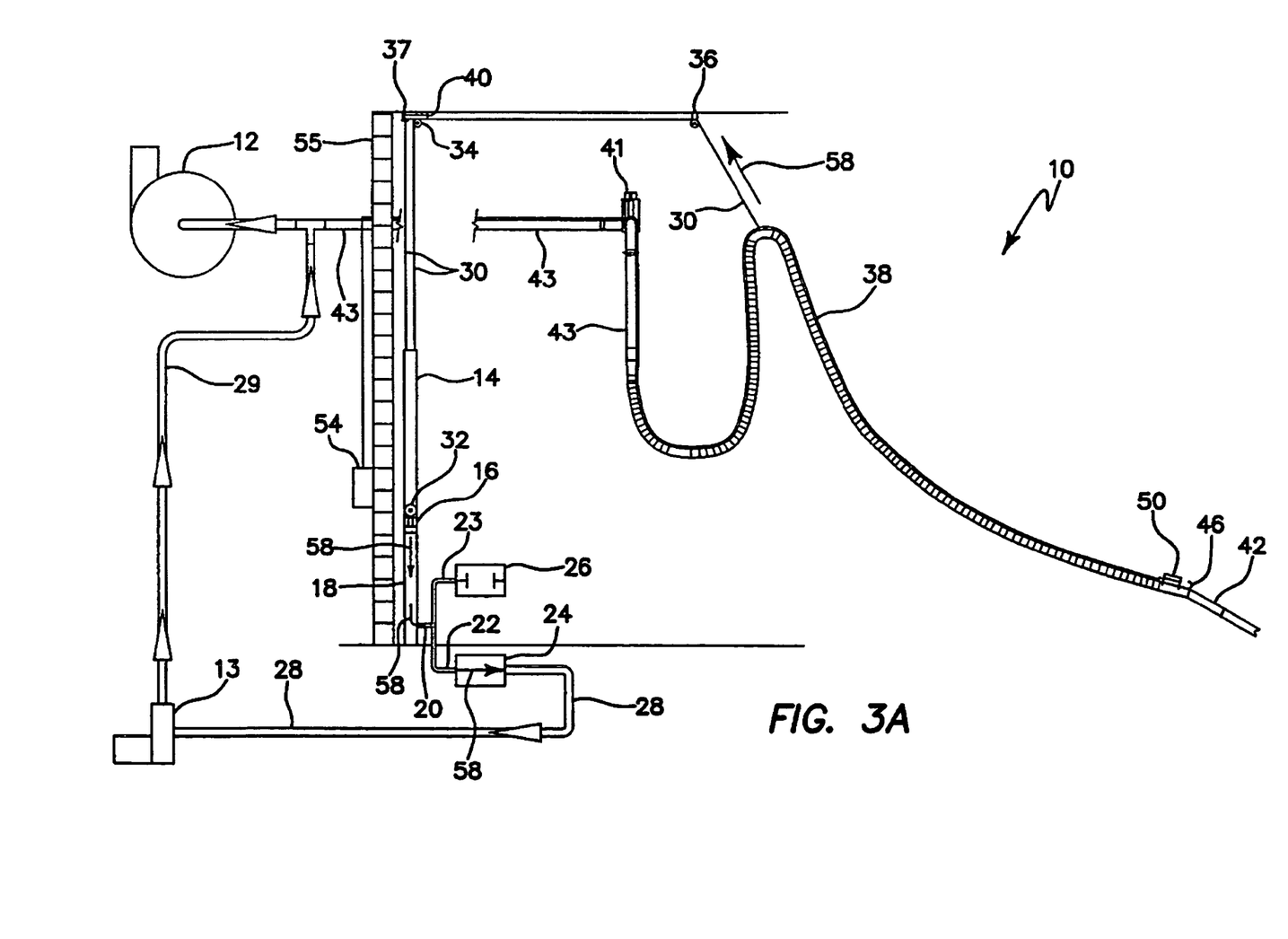

Referring now more particularly to FIGS. 1a, 2a, and 3a, a first embodiment of the present invention is illustrated. In this embodiment, the main flow line 20 branches into two flow lines, namely first branch line 22 and second branch line 23. The first branch line 22 extends from the main flow line 20, and leads to a first valve 24, the function of which will be described hereinbelow. The second branch line 23 extends from the main flow line 20, and leads to a second valve 26, the function of which will also be described hereinbelow. A third flow line 28 extends from a downstream end of the second valve 24 to a low pressure side of the vacuum pump 13 (if one is desired). A fourth flow line 29 extends from the high pressure side of the vacuum pump 13 and leads to the low pressure side of the vacuum blower 12.

The piston 16 is connected to a cord and pulley system comprising a cord 30 disposed about pulleys 32, 34, and 36. The pulley 32 is optional and is attached to the piston 16. One end of the cord 30 extends through the pulley 32, out of the upper end of the festooning tube 14, about the pulley 34, and then about the pulley 36, which is suspended from an overhead location, such as the ceiling. When pulley 32 is used, the other end of the cord 30 extends out of the upper end of the festooning tube 14 and is attached to an overhead support 37. Pulley 34 and the overhead support 37 are both centered over the festooning tube 14 so as to keep the piston 16 in vertical orientation while it reciprocates in the festooning tube 14. When pulley 32 is not used, one end of the cord 30 is attached directly to the piston 16, and the other end of the cord 30 extends out of the upper end of the festooning tube 14, about the pulley 34, and then about the pulley 36. The other end of the cord 30 is attached to a hose 38. A brake 40 is associated with the cord 30, for a purpose to be described hereinbelow.

The brake 40 functions between set and released configurations, as will also be described hereinbelow. A lance portion 42 is disposed on a distal end of the hose 38, and the proximal end of the hose is attached to the motorized vacuum pressure or blower source 12 mounted in a suitable location. The low pressure side of the source 12 is connected to the high pressure side of the vacuum pump 13 (if present). The lance portion 42 may include a handle, of known construction in the art, for convenient vacuuming, or cleaning operation. A suitable filter (not shown), known in the prior art, such as a cyclone collector assembly or dust collector, is employed to collect the dirt and debris recovered by the lance portion 42, metal ducting 43, and the associated hose 38 when vacuuming dust, paper, or material.

In FIG. 1a, the system 10 is illustrated in its stowed configuration. In this configuration, the piston 16 is fully retracted to the bottom end of the festooning tube 14, and both two-position valves 24 and 26 are closed. Because the piston 16 is retracted, the cord 30, attached thereto, is fully retracted as well, meaning that the hose 38, to which it is attached, is drawn upwardly to a suspended position adjacent to the pulley 36, as shown. If desired, the lance portion 42 may be raised to the roof by means of additional optional pulleys such as pulley 44, for convenient storage, using a provided hook 46 or the like, and a cord 47, the other end of which is fastened to a cleat 48 on the wall or other convenient location.

Figure 1B:
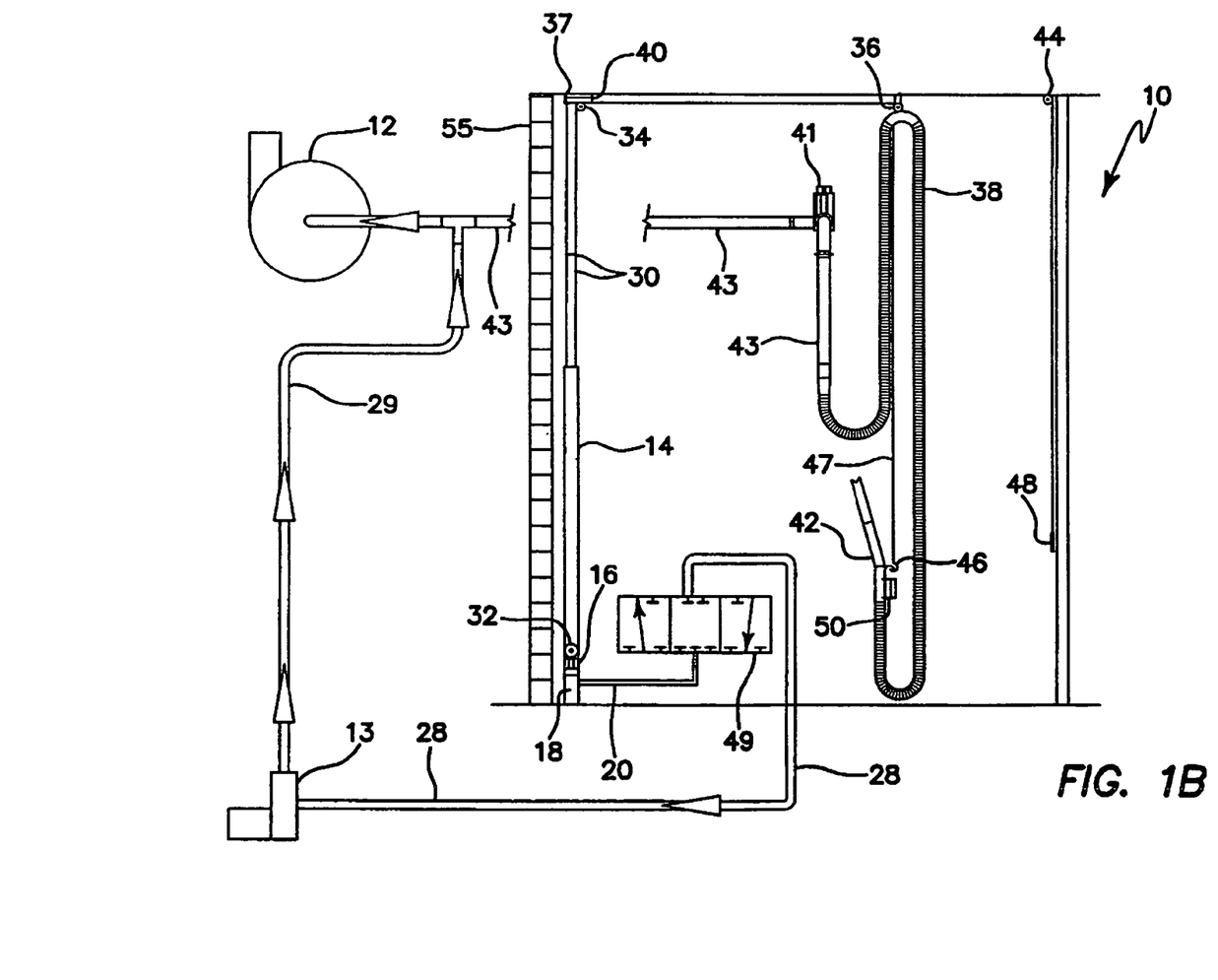
FIG. 1b is a schematic view similar to FIG. 1b, showing a second embodiment of the invention.

The embodiment of FIG. 1b is similar to that of FIG. 1a, also illustrating the system 10 in a fully retracted condition. The primary difference between the two embodiments is that, in the embodiment of FIG. 1b, a single three-way valve 49 is employed, rather than the first and second valves 24 and 26 employed in the FIG. 1a embodiment. Thus, in FIG. 1b, the main flow line 20 leads to an upstream side of the three-way valve 49, and the third flow line 28 extends from the downstream side of the valve 49. The valve 49 is in a closed position in the FIG. 1a (fully retracted) configuration.

Figure 2B:
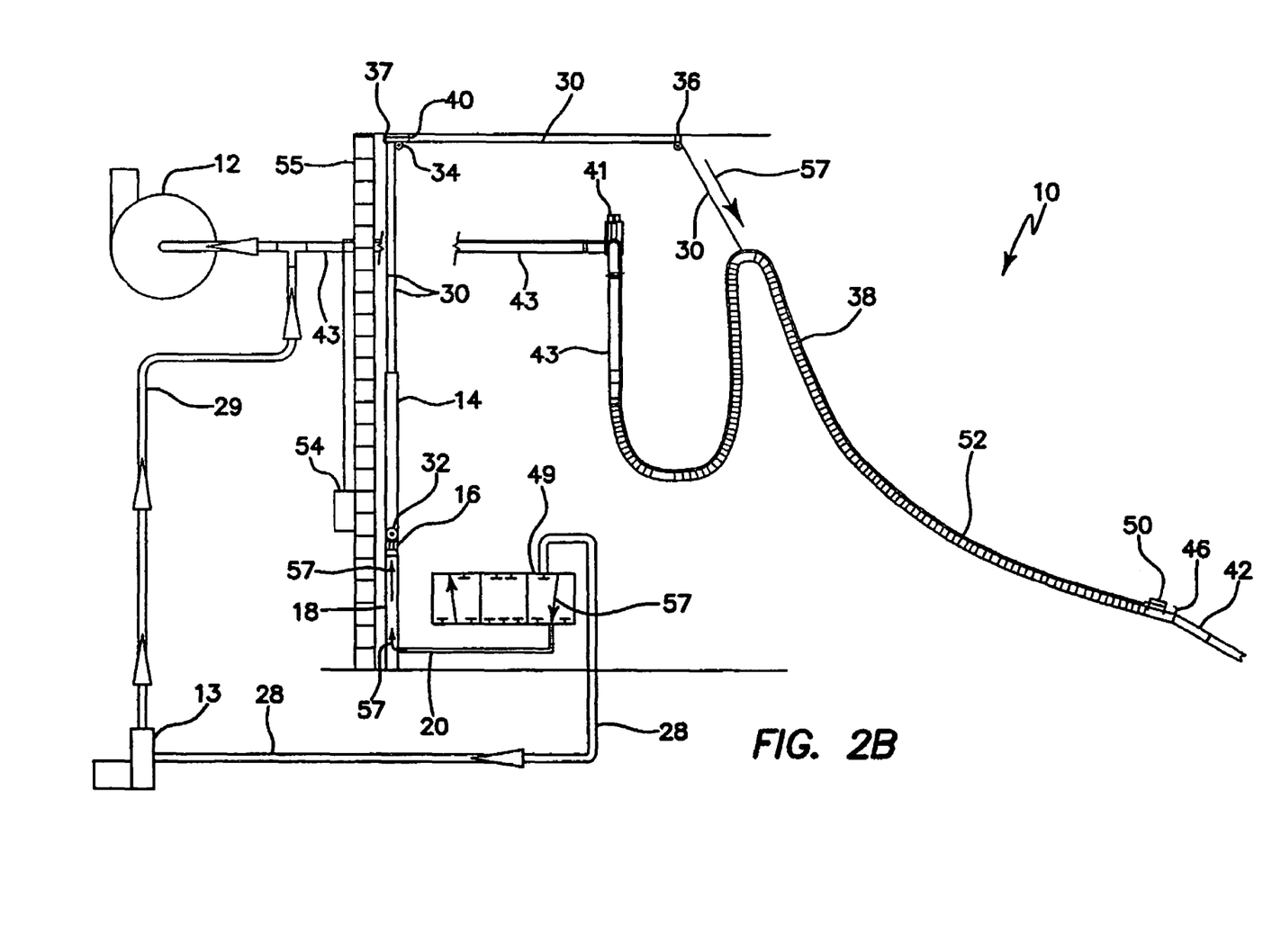
FIG. 2b is a schematic view, similar to FIG. 2a, of the embodiment of FIG. 1b.

Now with reference to FIGS. 2a and 2b, the system 10 is shown in an extended or "fed out" configuration, for the purpose of vacuuming, cleaning, or extracting fumes from one or more mass transit vehicles or the like. To extend the hose 38 to an operable position, the operator actuates a control switch 50 which is preferably conveniently disposed on the lance handle portion 42, as shown, although it may alternatively be disposed in any desired location. One advantage of the present invention over prior art hose reel systems is that the control switch need not be a relatively expensive remote wireless actuator, which uses RF control features known in the art, but may rather be a simple and relatively inexpensive hard-wired actuator, wherein the control wire 52 connecting the switch 50 to a control unit 54 is looped about the length of the hose 38, from the lance handle portion 42 back to the control unit 54, which may be mounted on the wall 55 or other suitable location. The use of a hard wire looped about the hose is feasible because the hose is not stored in a coiled configuration about a hose reel, which would twist and damage the wire as the hose reel rotates.

Now referring particularly to FIG. 2a, when the control switch 50 is actuated, valve 24 opens, while valve 26 remains closed, thereby directing air from the atmosphere into the system through the valve 24, as shown by arrows 56. Because the valve 26 remains closed, the air is directed through the second branch line 23 and main flow line 20 into the cylinder chamber 18, thereby causing the piston 16 to move upwardly within the festooning tube 14. Movement of the piston 16 upwardly in turn causes the cord 30 to move upwardly.

In the FIG. 2b embodiment, actuation of the control switch 50 causes the valve 49 to move to an open to atmosphere position, as shown, thereby directing air from the atmosphere into the system through the valve 49, as shown by arrows 57. Because the valve 49 is in its open to atmosphere position, the air is directed through the flow line 20 into the cylinder chamber 18, thereby causing the piston 16 to move upwardly within the festooning tube 14. Movement of the piston 16 upwardly in turn causes the cord 30 to move upwardly, as is the case also with the FIG. 2a embodiment.

Thus, in both the FIGS. 2a and 2b embodiments, actuation of the control switch 50 ultimately causes the cord 30 to move upwardly. This action, in turn, causes the brake 40 to be released, thereby permitting the cord 30 to play outwardly from the pulley 36, as shown in both FIGS. 2a and 2b, thus releasing the hose 38 and permitting the operator to utilize the lance handle portion 42 for desired cleaning operations. A slide gate valve 41, forming a part of the vacuum source 12, is also opened by actuation of the control switch 50, thereby delivering vacuum pressure or blow nozzle air to the lance portion 42.

Figure 3B:
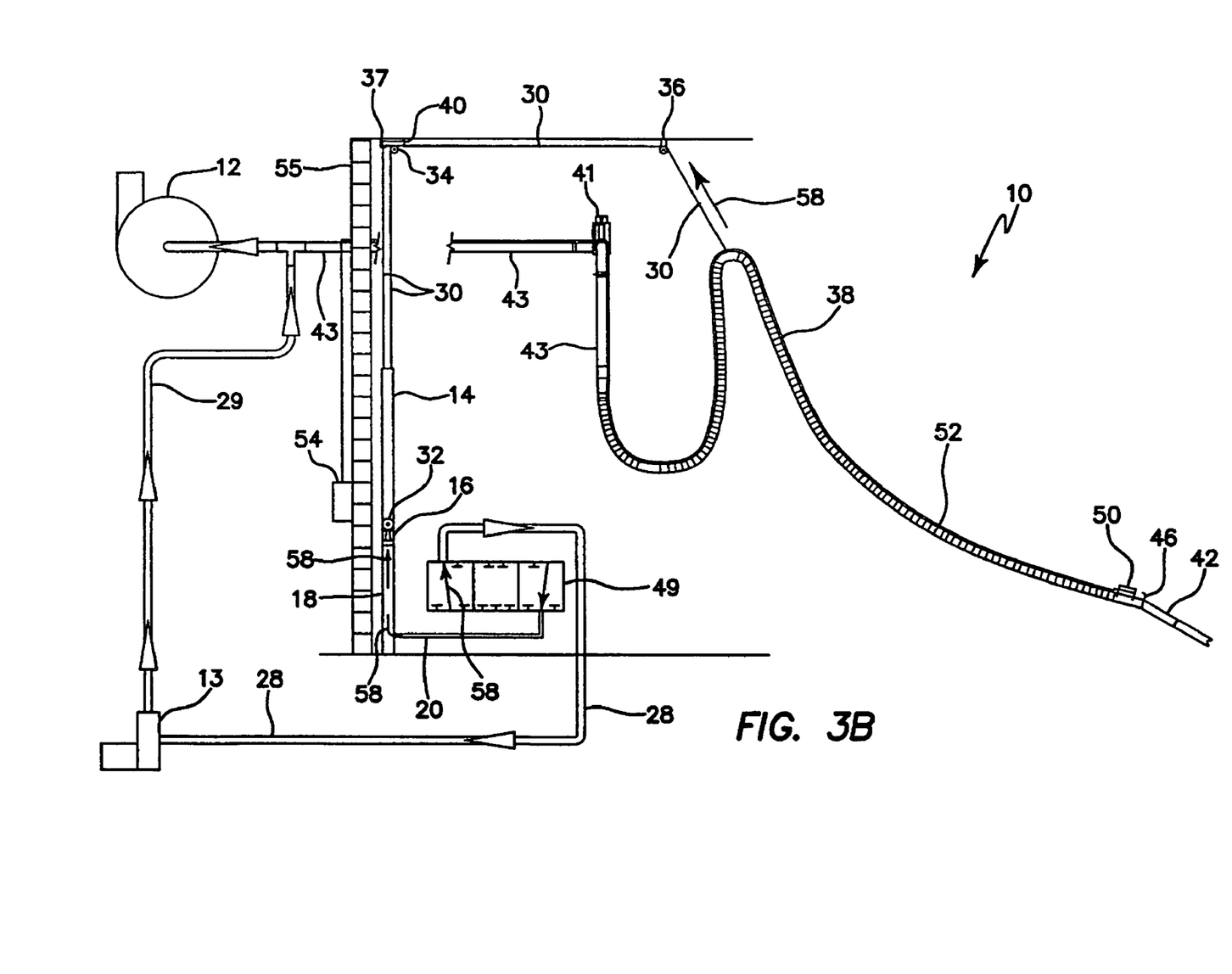
FIG. 3b is a schematic view, similar to FIG. 3a, of the embodiment of FIGS. 1b and 2b.

Now with reference to FIGS. 3a and 3b, at the conclusion of vacuuming or cleaning operations, when it is desired to retract the hose 38 to its storage position, the control switch 50 may be depressed in order to actuate the system to a retract mode. In the FIG. 3a embodiment, initiation of the retract mode causes valve 26 to close and valve 24 to open, thereby permitting a flow of air from the cylinder chamber 18 through flow lines 20 and 22, then through the valve 24, to the flow lines 28 and 29, which lead to the vacuum blower 12. Arrows 58 illustrate the direction of airflow. Since the valve 26 is closed, no air flows through the second branch line 23. The pressure drop in the cylinder chamber 18, due to the open valve 24, causes the piston 16 to retract downwardly within the festooning tube 14, as shown, thus causing, in turn, the cord 30 to retract toward the pulley 36, in the direction of arrow 58. Ultimately, this action permits the hose 38 to be stowed in the manner shown in FIG. 1a. When the cord 30 reaches its fully retracted position, as shown in FIG. 1a, the brake 40 becomes set once again, holding the cord 30 in its retracted position.

In the FIG. 3b embodiment, at the conclusion of the cleaning operation, when it is desired to retract the hose 38, the control switch 50 is actuated, thus initiating the retract mode. This mode is initiated by causing valve 49 to move to the open to vacuum position, as shown in FIG. 3b, thereby permitting a flow of air from the cylinder chamber 18 through flow line 20 and the valve 49, as indicated by arrow 58, to flow lines 28 and 29, which lead to vacuum pump 13 (if needed) and the vacuum blower 12. Since the valve 49 is in the open to vacuum position, no air flows through the valve to the atmosphere. The pressure drop in the cylinder chamber 18, due to the valve 49 being in the open to vacuum position, causes the piston 16 to retract downwardly within the festooning tube 14, as shown, thus causing, in turn, the cord 30 to retract toward the pulley 36, in the direction of arrow 58. Ultimately, this action permits the hose 38 to be stowed in the manner illustrated in FIG. 1*b*. When the cord 30 reaches its fully retracted position, as shown in FIG. 1*b*, the brake 40 becomes set once again, holding the cord 30 in its retracted position.

Regarding the optional pulley 32, discussed above, it should be noted that the diameter of the festoon piston 16 and the use or non-use of pulley 32 determines the festooned hose lifting force. The usage of pulley 32 permits the festoon tube piston to travel one-half of the distance that the hose travels, and thereby allows longer lengths of festooned hose in areas of low head room. However, using pulley 32 causes the festoon piston to have one-half the lifting force. Thus, there is a design trade-off which dictates the employment or non-employment of the piston 32, depending upon individual application.

Thus, the resultant system comprises a festoon hose 38 which is suspended from the ceiling or other suitable overhead support to create a convenient mechanism for storing and maneuvering the hose during use. The inventive system 10 may be installed in an existing bay of a transit vehicle facility, such as a fueling or service station or the like. The advantages of such a system include:

a) the provision of an easily available hose to the operator;

b) the ability to use a reliable, hard-wired, customized lance handle for controlling the hose feed, retract, and vacuum functions, thereby eliminating the need for relatively unreliable, expensive, and fragile remote control handsets;

c) greater air flow and elimination of plugging of the vacuum or cleaning system caused by hose reel elbows and turns;

d) retraction of the hose with a user friendly pneumatic, rather than gear-driven, retraction force;

e) suspension of the hose by the cord 30 at the entry door of the transit vehicle, or near the bus engine exhaust tail pipe, thereby making it much easier to manipulate the hose in or around the vehicle, relative to alternative hose reel systems or hose brackets, wherein the hose must be dragged along the floor surface of the facility;

f) creation of a less congested, aesthetically pleasing fuel island and cleaning area;

g) a simplified duct system;

h) energy efficient, requiring very little electrical power to operate;

i) extremely reliable and easy to maintain; and j) can be furnished and installed for substantially less cost than prior art hose reel systems.

The apparatus and method of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A festoon hose handling system for mass transit vehicles such as buses or the like, comprising:

a vacuum or fluid pressure source;

a hose connected to said vacuum source;

a distal end of the hose, through which fluid may pass; and a festoon assembly for suspending the hose from a suitable support, said festoon assembly comprising a festooning tube having a movable piston disposed therein, and a chamber disposed adjacent to said piston, said chamber having a flow passage connected thereto for permitting the pressure in said chamber to be changed in order to move said piston in a desired direction;

wherein the hose is pneumatically extendable and retractable.

2. The festoon hose handling system as recited in claim 1, and further comprising a control switch in proximity to said hose distal end for pneumatically extending and retracting the hose.

3. The festoon hose handling system as recited in claim 1, wherein said flow passage includes a valve therein which is selectively actuatable between a closed and an open position.

4. The festoon hose handling system as recited in claim 3, wherein said valve comprises a three-position valve which is selectively actuatable between said closed position, an open to vacuum position, and an open to atmosphere position.

5. The festoon hose handling system as recited in claim 3, wherein said flow passage comprises two connected flow passages, said valve being disposed in one of said flow passages and a second valve being disposed in a second one of said flow passages, said second valve also being selectively actuatable between a closed and an open position.

6. The festoon hose handling system as recited in claim 1, and further comprising a cord attached to said piston on one end and to said hose on a second end, wherein when said piston moves in a first direction, said cord moves with the piston in said first direction to extend the hose, and when the piston moves in a second direction, said cord moves with the piston in said second direction to retract the hose.

7. The festoon hose handling system as recited in claim 6, and further comprising a brake disposed adjacent to said cord at a predetermined location, said brake being selectively actuatable between a set position, wherein the cord is prevented from moving, and a released position, wherein the cord is free to move.

8. The festoon hose handling system as recited in claim 6, and further comprising a pulley about which said cord is arranged to travel when moving in said first or second directions.

9. The festoon hose handling system as recited in claim 8, and further comprising a plurality of pulleys about which said cord is arranged to travel when moving in said first or second directions.

10. A festoon hose handling system for mass transit vehicles such as buses, comprising:

a vacuum or fluid pressure source;

a hose connected to said vacuum or fluid pressure source; and a festoon assembly for suspending the hose from a suitable support, said festoon assembly comprising a cord attached to said hose on one end and to a movable member on a second end, the movable member being actuatable to selectively retract and extend said hose.

11. The festoon hose handling system as recited in claim 10, and further comprising a control switch disposed in proximity to a distal portion of said hose, for actuating said movable member.

12. The festoon hose handling system as recited in claim 10, wherein said movable member is pneumatically driven.

13. The festoon hose handling system as recited in claim 10, and further comprising a festooning tube in which said movable member is disposed, and a chamber located adjacent to said movable member, said movable member reciprocating within said festooning tube responsive to changes in pressure in said chamber.

14. The festoon hose handling system as recited in claim 13, and further comprising a flow passage connected to said chamber for permitting the pressure in said chamber to be selectively changed, and a valve disposed in said flow passage which is selectively actuatable between a closed and an open position, said flow passage connecting said chamber to said vacuum or fluid pressure source.

15. The festoon hose handling system as recited in claim 14, said system having a stowed configuration, wherein said hose is stowed in a retracted condition, an extended configuration, wherein said hose is extended in an operational condition, and a retracted configuration, wherein said hose is permitted to retract to said retracted condition from said extended condition.

16. A method of vacuuming, cleaning, or extracting fumes from a mass transit vehicle such as a bus or the like, using a system having a festooned hose which is suspended from a suitable support using a festoon assembly comprising a cord attached to the festooned hose on one end, and to a movable member on a second end, said method comprising:

actuating a control switch to cause said movable member and attached cord to move in a first direction toward said festooned hose, thereby extending the festooned hose to a desired cleaning location;

maneuvering said festooned hose as desired to vacuum, clean or extract fumes from said mass transit vehicle; and actuating the control switch to cause said movable member and attached cord to move in a second direction opposite to said first direction, thereby retracting said festooned hose to a storage position.

17. A festoon hose handling system for mass transit vehicles such as buses or the like, comprising:

a vacuum or fluid pressure source;

a hose connected to said vacuum source;

a distal end of the hose, through which fluid may pass;

a festoon assembly for suspending the hose from a suitable support;

wherein the hose is pneumatically extendable and retractable; and a control switch in proximity to said hose distal end for pneumatically extending and retracting the hose.

18. The festoon hose handling system as recited in claim 17, and further comprising a control wire which is disposed along said hose along a substantial length thereof, electrically connecting said control switch to a control unit.

* * * * *